Oct. 21, 1969   SHIGERU WAKU   3,473,958
HIGH DIELECTRIC CONSTANT CERAMIC MATERIAL AND METHOD
OF PRODUCING SAME
Filed July 26, 1967
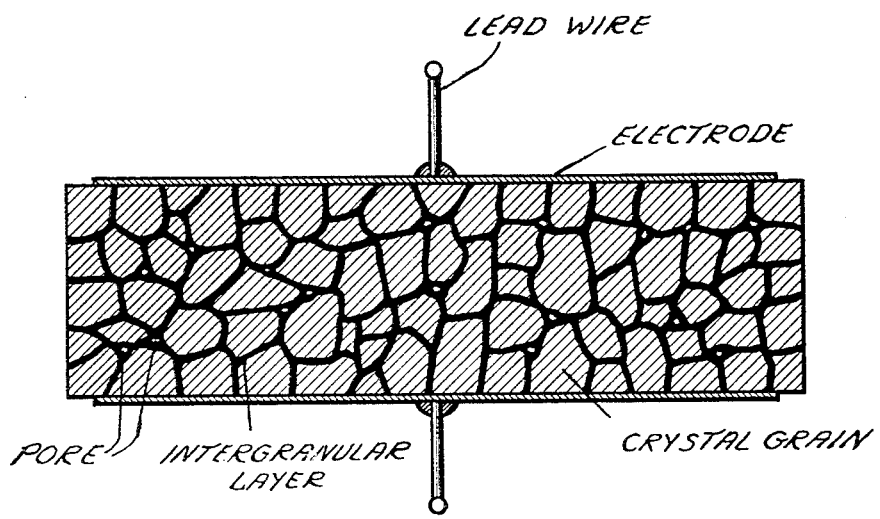
INVENTOR
SHIGERU WAKU
BY Watson, Cole, Grindle & Watson
ATTORNEYS United States Patent Office 3,473,958
Patented Oct. 21, 1969

3,473,958
HIGH DIELECTRIC CONSTANT CERAMIC MATERIAL AND METHOD OF PRODUCING SAME
Shigeru Waku, Tokyo, Japan, assignor to Nippon Telegraph and Telephone Public Corporation, Tokyo, Japan, a corporation of Japan
Continuation-in-part of application Ser. No. 345,124, Feb. 17, 1964. This application July 26, 1967, Ser. No. 656,034
Claims priority, application Japan, Feb. 22, 1963, 38/7,658
Int. Cl. H01g 9/00; C03c 17/00
U.S. Cl. 117—200                    13 Claims

ABSTRACT OF THE DISCLOSURE

An intergranular barrier layer high dielectric constant ceramic is disclosed which is made by depositing Mn, Cu, and Bi or a compound thereof on the surface of a barium titanate series semiconductive ceramic and firing it in an oxidizing atmosphere so that an insulating layer containing the above mentioned element is formed only in the grain boundary part of the semiconductive crystal grains from the surface through to the interior of the ceramic.

This application is a continuation-in-part of my copending application Ser. No. 345,124, filed Feb. 17, 1964, now abandoned.

BACKGROUND OF THE INVENTION

This invention relates to a high dielectric constant ceramic of barium titanate or its solid solution series having an insulating layer between crystal grain boundaries an methods of producing the same.

In a conventional intergranular barrier layer dielectric ceramic, as disclosed in U.S. Patent No. 3,028,248 of R. M. Glaister, a porous ceramic made by using high purity barium titanate as a raw material is made into semiconductors by reduction and is then re-oxidized in an oxidizing atmosphere so that an insulating barrier layer may be formed betwen crystal grain boundaries of the part adjacent to pores. According to this conventional technique, a high dielectric constant ceramic of an apparent dielectric constant of about 100,000 can be obtained but there have been defects in that the ceramic base is necesarily so porous that the moisture proof characteristics are insufficient in practice and the insulating layer is so imperfect that the working voltage is low and the frequency characteristics are also low.

SUMMARY OF THE INVENTION

An object of the present invention, taking the above described points into consideration, is to provide a high dielectric constant ceramic having a substantially complete insulating layer between crystal grain boundaries over the whole volume from the surface to the interior of the ceramic base which is low in porosity and a method of producing the same.

Another object of the present invention is to provide a high dielectric constant ceramic high in moistureproofness, working voltage and frequency characteristics and having high dielectric characteristics and a method of producing the same.

A further object of the present invention is to provide a high dielectric constant ceramic in which it is possible to use a ceramic base made of a cheap commercial grade raw material containing impurities as well as a high purity raw material and a method of producing the same.

DETAILED DESCRIPTION

The above described objects and features of the present invention will be made clearer by the subsequent detailed description and the drawing which is a side view in section of a ceramic capacitor employing the dielectric ceramic material of the present invention.

The method of the present invention comprises the steps of depositing on the surface of a barium titanate series semiconductive ceramic coating such material as will form an insulating layer between the crystal grain boundaries of the base of said ceramic due to subsequent firing for one to two hours according to a predetermined temperature controlling program having a maximum temperature of at least 1000° C. and up to 1300° C. in an oxidizing atmosphere containing an oxidizing agent. An insulating layer containing at least one ingredient element of the above mentioned deposited materials will be formed between the crystal grain boundaries of the above mentioned base and said deposited material will substantially vanish from the surface of said base after the above mentioned firing.

As well known, a barium titanate series semiconductive ceramic is made by a so-called valency controlling method wherein the raw material of a barium titanate series ceramic is fired with the addition of (a) trivalent Y and a rare earth element, (b) such monovalent element as, for example, K and Ag, (c) such penta- or trivalent element as, for example, Nb, Ta, Sb or Bi or (d) such monovalent element as, for example, F or Cl. They are made also by a so-called reducing method wherein the above mentioned ceramic is reduced in a vacuum or a reducing atmosphere. Said semiconductor ceramic may be in any of such forms used usually for capacitors as discs, plates, rods and tubes.

The barium titanate series ceramic so called here includes not only a barium titanate ceramic of a single composition but also a ceramic composition consisting of a solid solution of barium titanate with (a) a titanate of other alkaline earth metals than barium, (b) a zirconate or stannate of alkaline earth metals or (c) a titanate, zirconate or stannate of Pb, Sb or Bi or a mixture thereof.

Further, the raw material of the barium titanate series semiconductive ceramic to be used in the present invention may be either a high purity barium titanate or a commercial grade barium titanate containing impurities. The commercial grade barium titanate here can be exemplified by barium titanate having a purity of about 98.7% by weight containing about 0.1% by weight of Na and other impurities.

The above mentioned deposited material forming an insulating layer consists of at least one element selected from among V, Cr, Mn, Fe, Co, Ni, Cu, As, Sb, Bi, Tl, Ag, Sn and Si, a mixture thereof, a compound containing at least one of the above mentioned elements or a mixture of them. The above mentioned compound consists of an oxide of any of the above mentioned elements or such compound which will be easily converted to an oxide by thermal decomposition as, for example, (a) a carbonate, hydroxide or nitrate of any of the above mentioned elements or (b) such compound of any of the above mentioned elements containing oxygen as $K_2Cr_2O_7$, $KMnO_4$ or $BaMnO_4$.

The above mentioned material is deposited on the above mentioned semiconductive ceramic base by properly using such method usually carried out for deposition as, for example, by spraying molten metals, spraying or depositing and drying an aqueous solution, liquid suspension or paste, dipping in an aqueous solution and drying or evaporation or sputtering in a vacuum.

The proper amount of deposition is such that, when fired as mentioned above, the above mentioned deposited material may infiltrate into the base so as to substantially vanish from the surface of the base. Therefore, the deposition may be made on either surface of the ceramic and the area of deposition may be properly selected in response to the object.

When fired, the above mentioned deposited material will easily infiltrate into the base along the pores in the ceramic base, will substantially completely fill the above mentioned pores and will at the same time easily diffuse along the crystal grain boundary of the ceramic so that a thin layer of a solid solution of the above mentioned ingredient element of the deposited material and the barium titanate series composition may be formed along the crystal grain boundary part. This thin layer of the solid solution will be converted to a substantially perfect insulating layer at a temperature of 600 to 1200° C. by the action of the oxidizing agent which has come by easily diffusing from the oxidizing atmosphere along said thin layer. However, the diffusing velocity of the oxidizing agent into the crystal grain is so much lower than the diffusing velocity along the crystal grain boundary that the interior of the above mentioned crystal grain will not be converted but will remain semiconductive as it is.

For the above mentioned oxidizing atmosphere is used, for example, a flowing atmosphere preferably under 1 atm. containing oxygen gas. During the firing step carried out according to the above mentioned predetermined temperature controlling program, the content of oxygen may be properly varied.

When an electrode is baked by an ordinary method onto the surface of the ceramics obtained as described above, the interior of the above mentioned crystal grain will act as a conductor, the substantially perfect insulating layer formed along the above mentioned crystal grain boundary part will act as a dielectric film and thus the dielectric ceramic having a very high apparent dielectric constant and favorable characteristics will be obtained. That is to say, the obtained characteristics were an apparent dielectric constant of at least 20,000, a dielectric loss of less than 0.08% at 10 kc., a specific resistivity of more than $7 \times 10^3 \Omega$-cm. and a dielectric strength of more than 2,000 v./mm. where the apparent dielectric constant was 20,000 to 30,000.

Further, in the obtained ceramic, as the pores which had existed in the interior of the base before the above mentioned firing had been substantially completely filled as described above, the moistureproof characteristics were remarkably improved.

The characteristics of the high dielectric constant ceramic by the method of the present invention are obtained by properly selecting the kind of base, kind of the deposited material, the amount of the deposition and firing conditions. Therefore, these conditions must be individually determined in response to the object but will be able to be easily understood from the following examples.

Example 1

A disk 10 mm. in diameter and 0.7 mm. thick of a barium titanate semiconductive ceramic on the surface of which $BaMnO_4$ had been deposited by electrolytic oxidation in an aqueous solution of $BaMnO_3$, had been rinsed in water and had been dried was fired at 1,300° C. for 1 hour and was allowed to cool in an oven. Of the obtained ceramic, the apparent dielectric constant $\epsilon$ was 35,000, the dielectric loss tan $\delta$ was 0.07 at 10 kc., and the specific resistivity $\rho$ was $1 \times 10^{10} \Omega$-cm.

The size of the ceramic base in each of the following examples was the same as in this Example 1.

Example 2

A barium titanate semiconductive ceramic which had been dipped in a saturated aqueous solution of $KMnO_4$ and had been drained and dried was fired at 1,300° C. for 1 hour and was then allowed to cool in an oven. The dielectric characteristics of the obtained ceramic were $\epsilon=400,000$, tan $\delta=0.08$ at 10 kc. and $\rho=10^{10} \Omega$-cm.

Example 3

A barium titanate semiconductive ceramic on one surface of which 12 mg./cm.³ of $Bi_2O_3$ had been deposited in the form of a paste and had been dried was fired at 1,300° C. for 2 hours and was then allowed to cool in an oven. The dielectric characteristics of the obtained ceramic were $\epsilon=20,000$, tan $\delta=0.03$ at 10 kc. and $\rho=1 \times 10^{10} \Omega$-cm.

Example 4

A barium titanate semiconductive ceramic on one surface of which 0.2 mg./cm.² of metallic copper had been evaporated in a vacuum was fired at 1,000° C. for 1 hour and was then allowed to cool in an oven. The dielectric characteristics of the obtained ceramic were $\epsilon=60,000$, tan $\delta=0.05$ at 10 kc. and $\rho=7 \times 10^8 \Omega$-cm.

Example 5

A barium titanate semiconductive ceramic on one surface of which 4 mg./cm.² of CuO had been deposited in the form of a paste was fired at 1,300° C. for 2 hours and was then allowed to cool in an oven. The dielectric characteristics of the obtained ceramic were $\epsilon=32,000$, tan $\delta=0.25$ at 10 kc. and $\rho=3 \times 10^{11} \Omega$-cm.

Example 6

A barium titanate solid solution semiconductive ceramic comprising a $Ba(Ti_{0.9},Sn_{0.1})O_3$ on one surface of which 0.2 mg./cm.² of CuO had been deposited in the form of a paste and had been dried was fired at 1,300° C. for 2 hours and was then allowed to cool in an oven. The dielectric characteristics of the obtained ceramic were $\epsilon=40,000$, tan $\delta=0.04$ at 10 kc. and $\rho=8 \times 10^{10} \Omega$-cm.

Example 7

A barium titanate solid solution semiconductive ceramic comprising $(Ba_{0.75},Sr_{0.25})TiO_3$ was treated in the same manner as in Example 6. The dielectric characteristics of the obtained ceramic were $\epsilon=27,000$, tan $\delta=0.06$ at 10 kc. and $\rho=1 \times 10^{11} \Omega$-cm.

The raw material of the barium titanate shown in each of the above examples was commercial grade barium titanate.

What is claimed is:

1. A method of manufacturing a high dielectric constant ceramic material comprising the steps of depositing a coating material on a barium titanate series ceramic body having a semiconductive property, said coating material containing at least one metallic element selected from the group consisting of Mn, Cu, Ag, Bi, Sb, and As, firing said coated body in an oxidizing atmosphere at a temperature between 1000° C. and 1300° C. for one to two hours and cooling said body to a temperature between 600° C. and 1200° C. in an oxidizing atmosphere, whereby granules of said ceramic body are substantially insulated from one another by an intergranular layer substantially consisting of at least one of said metallic elements and said barium titanate series ceramic composition.

2. A method as claimed in claim 1 wherein said coating material is an oxide of said metallic element.

3. A method as claimed in claim 2 wherein said oxide is selected from the group consisting of CuO and $Bi_2O_3$.

4. A method as claimed in claim 1 wherein said coating material is the metal of said metallic element.

5. A method as claimed in claim 4 wherein said metal is copper.

6. A method as claimed in claim 1 wherein said coating material is a compound of said metallic element capable of being converted into an oxide at said firing temperature.

7. A method as claimed in claim 6 wherein said compound is selected from the group consisting of $BaMnO_4$ and $KMnO_4$.

8. A method as claimed in claim 6 wherein said compound is selected from the group consisting of carbonates, hydroxides and nitrates of said metallic elements.

9. A method as claimed in claim 1 wherein said barium titanate series ceramic body is made of a commercial grade barium titanate.

10. A method as claimed in claim 1 wherein said ceramic body consists of a solid solution of barium titanate with at least one compound selected from the group consisting of (a) titanates of alkaline earth metals other than Ba, (b) zirconates and stannates of alkaline earth metals, (c) titanates, zirconates and stannates of Pb and Sn, and mixtures thereof.

11. A high dielectric constant ceramic material comprising substantially semiconductive granules of a barium titanate series composition, said semiconductive granules being insulated from one another throughout the whole interior of said ceramic material by an oxidized form of an intergranular layer consisting of said barium titanate series ceramic composition and at least one metallic element selected from the group consisting of Mn, Cu, Ag, Bi, Sb and As, the pores in said ceramic material being substantially filled by substantially the same composition as that of said intergranular layer and said granules being free from said metallic elements.

12. A high dielectric constant material as claimed in claim 11 wherein said barium titanate series composition comprises a commercial grade barium titanate.

13. A high dielectric constant ceramic material as claimed in claim 11 wherein said barium titanate series composition consists of a solid solution of a barium titanate with at least one compound selected from the group consisting of titanates of alkaline earth metals other than Ba, zirconates and stannates of alkaline earth metals, titanates, zirconates and stannates of Pb and Sn, and mixtures thereof.

References Cited
UNITED STATES PATENTS

| | | | |
|---|---|---|---|
| 2,852,400 | 9/1958 | Remeika | 252—62.3 X |
| 3,074,804 | 1/1963 | Planer et al. | 117—200 X |
| 3,231,799 | 1/1966 | Prokopowicz et al. | 252—63.2 X |
| 3,316,184 | 4/1967 | Magase et al. | 252—63.2 |
| 3,340,074 | 9/1967 | Herzog | 106—39 |

WILLIAM L. JARVIS, Primary Examiner

U.S. Cl. X.R.

106—39; 117—118, 121; 148—6.3, 6.31; 252—62.3